United States Patent
Song

(10) Patent No.: US 12,010,008 B2
(45) Date of Patent: Jun. 11, 2024

(54) NETWORK COMMUNICATION METHOD AND APPARATUS

(71) Applicant: Alibaba Group Holding Limited, Grand Cayman (KY)

(72) Inventor: Zhuo Song, Beijing (CN)

(73) Assignee: Alibaba Group Holding Limited, Grand Cayman (KY)

(*) Notice: Subject to any disclaimer, the term of this patent is extended or adjusted under 35 U.S.C. 154(b) by 323 days.

(21) Appl. No.: 16/958,662

(22) PCT Filed: Dec. 24, 2018

(86) PCT No.: PCT/CN2018/122996
§ 371 (c)(1),
(2) Date: Jan. 25, 2021

(87) PCT Pub. No.: WO2019/128905
PCT Pub. Date: Jul. 4, 2019

(65) Prior Publication Data
US 2021/0250272 A1    Aug. 12, 2021

(30) Foreign Application Priority Data
Dec. 29, 2017 (CN) .......................... 201711482414.2

(51) Int. Cl.
*H04L 45/02* (2022.01)
*H04L 45/00* (2022.01)

(52) U.S. Cl.
CPC .............. *H04L 45/02* (2013.01); *H04L 45/54* (2013.01)

(58) Field of Classification Search
CPC ................................ H04L 45/02; H04L 45/54
See application file for complete search history.

(56) References Cited

U.S. PATENT DOCUMENTS

| | | | |
|---|---|---|---|
| 5,999,536 A | 12/1999 | Kawafuji et al. | |
| 6,286,058 B1 * | 9/2001 | Hrastar | H04L 69/40 709/239 |

(Continued)

FOREIGN PATENT DOCUMENTS

| | | |
|---|---|---|
| CN | 101232437 A | 7/2008 |
| CN | 101645799 A | 2/2010 |

(Continued)

OTHER PUBLICATIONS

"Management nd Configuration Guide for the Procurve Switch 2600 Series, Switch 2600-PWR Series, Switch 2800 Series, Switch 4100 Ig Series and Switch 6108 (Oct. 2005) 7-1 7 IP Routing Features Contents" Oct. 1, 2005 (Oct. 1, 2005), pp. 1-14, XP055110204, Retrieved from the Internet: URL:HTTP://ftp.hp.com/pub/networking/software/AdvTraff-Oct2005-59908853-Chap07-IProuting.pdf (retrieved on Mar. 26, 2014).

*Primary Examiner* — Xavier S Wong

(57) ABSTRACT

The present application discloses a network communication method and apparatus. The method includes: receiving and parsing a packet so as to acquire a destination host Internet Protocol address; performing a single query on a route-neighbor table according to the destination host Internet Protocol address so as to acquire a physical address and a route type of a next hop route; and sending the packet according to the physical address and the route type. The present application simplifies an entire three-layer encapsulation processing process, and reduces occupancy of resources.

28 Claims, 8 Drawing Sheets

(56) References Cited

U.S. PATENT DOCUMENTS

| | | |
|---|---|---|
| 7,460,473 B1 | 12/2008 | Kodama et al. |
| 7,688,859 B2 | 3/2010 | Chen et al. |
| 7,808,918 B2 | 10/2010 | Bugenhagen |
| 7,821,931 B2 | 10/2010 | Swenson et al. |
| 7,957,378 B2 | 6/2011 | Panigrahy |
| 8,228,791 B2 | 7/2012 | Bugenhagen et al. |
| 8,374,090 B2 | 2/2013 | Morrill et al. |
| 8,619,596 B2 | 12/2013 | Wiley et al. |
| 8,743,700 B2 | 6/2014 | Heinz et al. |
| 9,185,082 B2 | 11/2015 | Dashora et al. |
| 9,344,906 B2 | 5/2016 | Morrill et al. |
| 2002/0143787 A1 | 10/2002 | Simon et al. |
| 2003/0179761 A1* | 9/2003 | Dobbins .......... H04L 45/00 370/466 |
| 2004/0249879 A1 | 12/2004 | Beverly |
| 2007/0101123 A1 | 5/2007 | Kollmyer et al. |
| 2010/0058027 A1* | 3/2010 | Gong .......... H04L 45/54 711/216 |
| 2010/0080235 A1 | 4/2010 | Yamate et al. |
| 2011/0099126 A1* | 4/2011 | Belani .......... G08G 1/14 705/418 |
| 2012/0127996 A1* | 5/2012 | Grosser .......... H04L 45/54 370/392 |
| 2013/0201988 A1* | 8/2013 | Zhou .......... H04L 45/16 370/390 |
| 2014/0226666 A1* | 8/2014 | Narasimhan .......... H04L 49/351 370/392 |
| 2014/0376551 A1* | 12/2014 | Broerman .......... H04L 12/4679 370/392 |
| 2016/0065463 A1* | 3/2016 | Wang .......... H04L 45/72 370/392 |
| 2016/0366056 A1* | 12/2016 | Calciu .......... H04L 45/02 |

FOREIGN PATENT DOCUMENTS

| | | |
|---|---|---|
| CN | 101707547 | 5/2010 |
| CN | 103281748 | 9/2013 |
| CN | 104253811 A | 12/2014 |
| CN | 106254256 | 12/2016 |
| EP | 1159813 B1 | 4/2005 |
| ES | 2294734 T3 | 4/2008 |
| JP | H10164118 | 6/1998 |
| JP | 2000151709 | 5/2000 |
| JP | 2004007412 | 1/2004 |
| JP | 2010087585 | 4/2010 |
| JP | 2011527535 A | 10/2011 |
| KR | 1020130050356 | 5/2013 |
| TW | I505185 A | 10/2012 |
| WO | 2010124563 A1 | 11/2010 |
| WO | WO2017063866 | 4/2017 |

* cited by examiner

| IP | MAC | Route | Type |
|---|---|---|---|
| 192.168.0.1 | aa:bb:cc:dd:ee:ff | 0 | 0 (route) |
| 192.168.0.2 | 0 (to be updated) | 0 | 1 (LAN) |
| ... | ... | ... | ... |
| Others | aa:bb:cc:dd:ee:fc | 192.168.0.1 | 2 (WAN) |

FIG. 4

NETWORK COMMUNICATION METHOD AND APPARATUS

The present application claims priority to Chinese Patent Application No. 201711482414.2 filed on Dec. 29, 2017 and entitled "NETWORK COMMUNICATION METHOD AND APPARATUS," corresponding to PCT Patent Application No.: PCT/CN2018/122996 filed Dec. 24, 2018 which are incorporated herein by reference in their entirety.

TECHNICAL FIELD

The present application relates to the field of network transmission, and in particular to a network communication method and apparatus.

BACKGROUND

Currently, in most cases, a TCP/IP network protocol stack is used for implementing network transmission. As shown in FIG. 1, the TCP/IP network protocol stack is divided into four layers: an application layer (Application), a transport layer (Transport), a network layer (Network), and a link layer (Link). FIG. 2 shows communication performed between two computers by means of a TCP/IP protocol; during transmission, encapsulation needs to be performed by the layers from top to bottom, and after arrival at a destination host, parsing is performed by the layers one by one from bottom to top, thereby achieving communication between devices.

Three-layer encapsulation mainly consists of a routing table, a neighbor table, and tables of various scopes. The routing table may further include caches. According to statistics, in many cases, programs use these tables in a simple manner, and once a network architecture is established, the structures of corresponding tables do not change substantially. However, these tables have to occupy storage space; furthermore, addition, deletion, modification, and checking performed on these tables respectively follow different logics, resulting in high maintenance costs. In addition, a large number of links result in an increase in runtime memory overheads, and in many service scenarios, a program needs to perform query operations a plurality of times, increasing the risk of memory overflow. Moreover, in terms of security, such design is more vulnerable to an ARP attack, thereby deteriorating the performance of a transmission device. A complex routing table and a complex neighbor table are not desirable for security or in a distributed environment.

SUMMARY

The present application provides a network communication transmission method, so as to improve the operation performance of a transmission device. In addition, the present application further provides a network communication apparatus.

The present application provides a network communication method, and the network communication method comprises:
- receiving and parsing a packet so as to acquire a destination host Internet Protocol address;
- performing a single query on a route-neighbor table according to the destination host Internet Protocol address so as to acquire a physical address and a route type of a next hop route; and
- sending the packet according to the physical address and the route type.

In addition, the present application further provides a network communication method, and the network communication method comprises:
- receiving and parsing a packet so as to acquire a destination host Internet Protocol address;
- determining whether a route-neighbor table is enabled, and if so, then performing a single query on the route-neighbor table so as to acquire a physical address and a route type of a next hop route; and
- sending the packet according to the physical address and the route type.

In addition, the present application further provides a network communication method, and the network communication method comprises:
- receiving and parsing a packet so as to acquire a destination host Internet Protocol address;
- determining whether a route-neighbor table is enabled; if so, then performing a single query on the route-neighbor table, and if a physical address of a next hop route is not found, then performing a next step;
- acquiring an Internet Protocol address of the next hop route by means of a route matching algorithm;
- acquiring the physical address of the next hop route according to the Internet Protocol address of the next hop route; and
- updating the physical address of the next hop route to the route-neighbor table, and sending the packet to the physical address.

In addition, the present application further provides a network communication method, and the network communication method comprises:
- receiving and parsing a packet so as to acquire a destination host Internet Protocol address;
- determining whether a route-neighbor table is enabled, and if not, then querying a routing table according to the destination host Internet Protocol address so as to acquire an Internet Protocol address of a next hop route;
- querying a neighbor table according to the Internet Protocol address of the next hop route so as to acquire a physical address of the next hop route; and
- sending the packet to the physical address.

In addition, the present application further provides a network communication method, and the network communication method comprises:
- verifying whether a destination host Internet Protocol address is a local address; if so, then receiving a packet, and
- sending the packet to a target application according to a packet port number; and
- if not, then when a forwarding function is enabled, performing a single query on a route-neighbor table so as to acquire a router physical address, replacing a physical address of a received packet with the router physical address, and forwarding the received packet to the router physical address.

In addition, the present application further provides a network communication apparatus, comprising:
- a parsing unit, used to receive and parse a packet so as to acquire a destination host Internet Protocol address;
- a query unit, used to perform a single query on a route-neighbor table according to the destination host Internet Protocol address so as to acquire a physical address and a route type of a next hop route; and a packet sending unit, used to send the packet according to the physical address and the route type.

In addition, the present application further provides a network communication apparatus, comprising:

a parsing unit, used to receive and parse a packet so as to acquire a destination host Internet Protocol address;

a determination unit, used to determine whether a route-neighbor table is enabled;

a query unit, used to, when the route-neighbor table is enabled, perform a single query on the route-neighbor table so as to acquire a physical address and a route type of a next hop route; and a packet sending unit, used to send the packet according to the physical address and the route type.

Compared with the prior art, an aspect of the present application has the following advantages:

Tables of all of three layers are combined into a single table, and a physical address and route information corresponding to an IP address can be acquired by means of a single query, thereby greatly simplifying a packet encapsulation processing process of all of the three layers, reducing occupancy of resources, minimizing any extra memory overheads, avoiding the memory overflow problem caused by a plurality of queries in certain service scenarios, improving operation efficiency, reducing memory overheads, and improving operation performance.

In terms of maintenance, only a single table needs to be maintained, thereby greatly reducing maintenance costs. In addition, query operations performed on a route-neighbor table are simple, thereby facilitating protection against an ARP attack.

BRIEF DESCRIPTION OF THE DRAWINGS

FIG. 4 is a schematic diagram of a route-neighbor table provided by the first embodiment and a second embodiment of the present application;

DETAILED DESCRIPTION

Many specific details are set forth in the following description to facilitate full understanding of the present application. However, the present application can be implemented in many other manners than that described herein, and those skilled in the art can make similar derivations without departing from the essence of the present application; therefore, the present application is not limited by the specific implementations described below.

As mentioned above, in existing three-layer data packet encapsulation, data is transmitted and received by means of a routing table and a neighbor table. A routing table is a spreadsheet (file) or a quasi-database stored on a router or a networked computer. The routing table contains topological information of a network perimeter. A main purpose of establishing a routing table is to implement a routing protocol and select a static route. If a destination host and a sending host are not in the same local area network, then an appropriate transmission path by means of which a packet can be transmitted to the destination host needs to be selected, and an Internet Protocol address of a next hop route through which the transmission path needs to pass needs to be acquired. The routing table stores a path to a specific network address. The neighbor table is also referred to as an ARP cache table. A correspondence between an IP address and a MAC address of a neighbor host in the network acquired by a protocol stack by means of an ARP protocol is stored in this table for next communication with a neighbor. In addition, an ARP module also provides a corresponding mechanism to update and maintain this neighbor table.

In an embodiment of the present application, the routing table and the neighbor table are combined into one table, and information of the two tables is stored in one data structure so as to form a route-neighbor table. The route-neighbor table (Route-neighbor Table) is a data structure including information such as an Internet Protocol address (IP address), a physical address, route information, and a route type. In this way, information of the routing table and the neighbor table in the prior art is in the same data structure. An IP can be used as a key for a hash query. When a packet passes through a three-layer protocol stack, IP address information is directly used in a single query so as to acquire a physical address and route information corresponding to the IP address. The solution of the present application is different from the solution of the prior art in which a routing table and a neighbor table need to be separately queried; that is, in the prior art, at least two queries are needed in order to acquire the above information.

Figure 1:
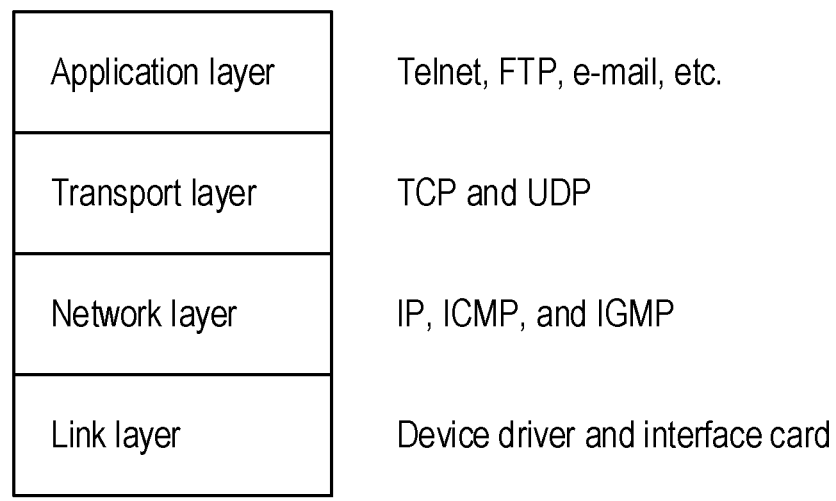
FIG. 1 is a schematic diagram of layers of a TCP/IP network protocol stack.
Figure 2:
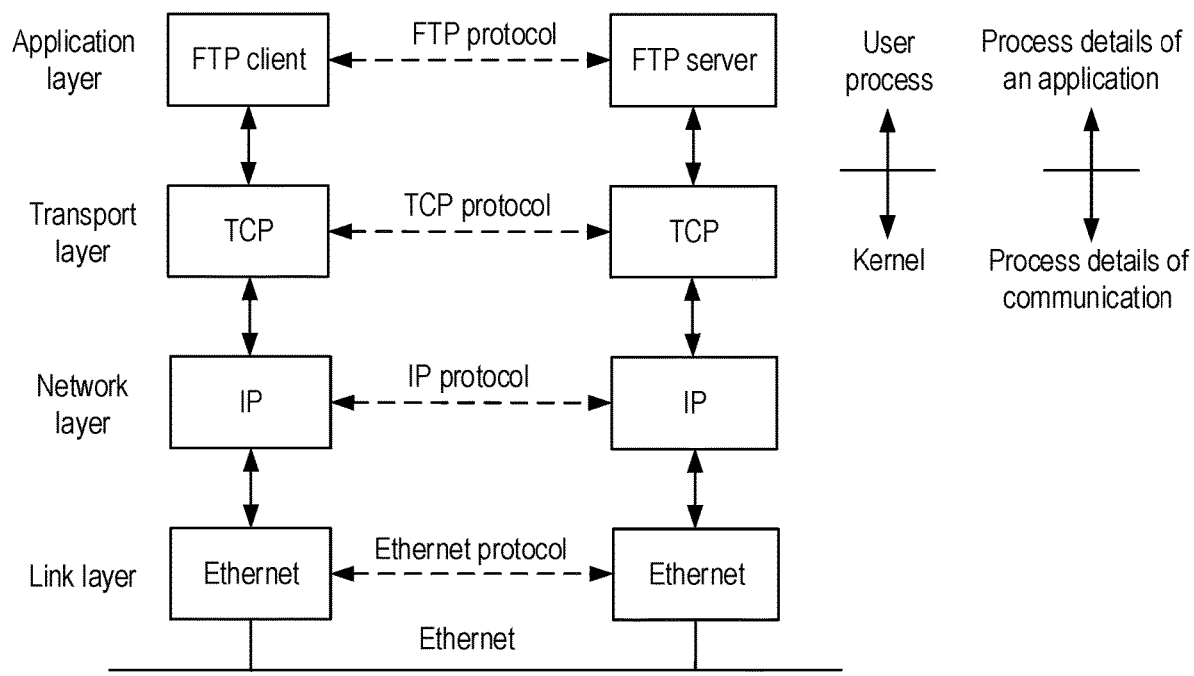
FIG. 2 is a schematic diagram of a process of communication performed between two computers by means of a TCP/IP protocol.
Figure 3:
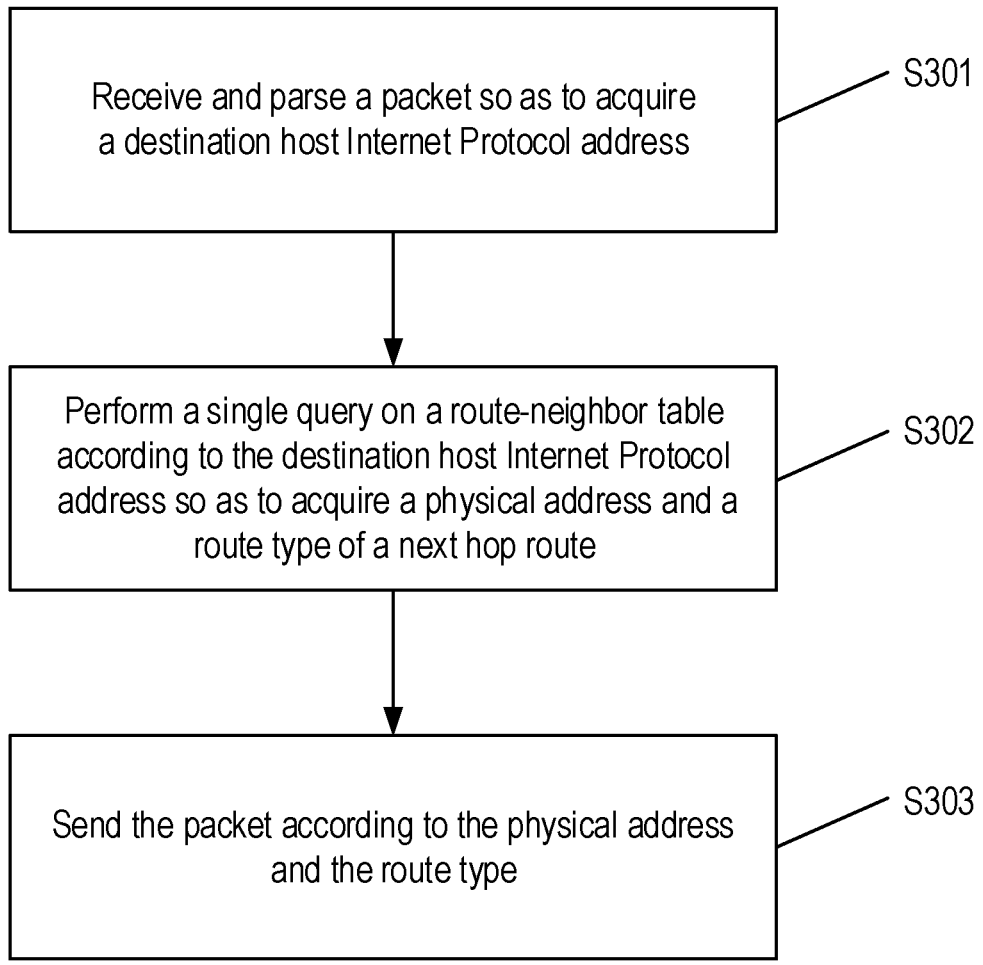
FIG. 3 is a flowchart of a network communication method provided by a first embodiment of the present application.

A first embodiment of the present application provides a network communication method. FIG. 3 shows a flowchart of a network communication method provided by an embodiment of the present application. Detailed description is given below with reference to FIG. 3.

In step 301, a packet is received and parsed so as to acquire a destination host Internet Protocol address.

This step is a starting step of this embodiment; that is, a three-layer protocol stack receives and parses a packet so as to acquire a destination host Internet Protocol address, so that an entire process of this method is started.

The packet (message) is a data unit exchanged and transmitted in a network, namely, a data block to be sent by a site at one time. The packet contains complete data information to be sent. The lengths of packets are not the same, are not limited, and are variable.

The Internet Protocol address is a numerical label assigned to a device using an Internet Protocol (IP) in the network.

In step S302, a single query is performed on a route-neighbor table according to the destination host Internet Protocol address so as to acquire a physical address and a route type of a next hop route.

The most important function of three-layer data packet encapsulation is to acquire a physical address (physical address) of a destination host or a next hop route according to a destination host Internet Protocol address in an upper-layer packet. Because the destination host and a sending host may not be in the same local area network, in the prior art, a routing table needs to be used to determine, by means of an Internet Protocol address of the destination host, whether the destination host and the sending host are in the same local area network. If the destination host and the sending host are in the same local area network, then the Internet Protocol address of the destination host is acquired. If the destination host and the sending host are not in the same local area network, then an appropriate transmission path by means of which a packet can be transmitted to the destination host is selected, and an Internet Protocol address of a next hop route through which the transmission path needs to pass is acquired. After the Internet Protocol address is acquired, the routing table is used to acquire, by means of the Internet Protocol address, a physical address corresponding to the Internet Protocol address. The physical address is embedded in a packet header, and is transmitted to a physical medium layer responsible for transmitting the packet.

In the present application, a routing table and a neighbor table in the above step are combined into one table, and information in the routing table and the neighbor table is stored in one data structure, so as to achieve the same function as the prior art.

The route-neighbor table (Route-neighbor Table) is a data structure including information such as an Internet Protocol address, a physical address, route information, and a route type, and records the above information of each device.

The data structure is a way of storing and organizing data in a computer. The data structure indicates an interface or encapsulation: one data structure can be considered as an interface between two functions, or is encapsulation of a method for accessing stored content formed by a data type union.

Specifically, the route-neighbor table can be organized in the form of a hash table; the Internet Protocol address, the physical address, the route information, and the route type are used as fields, and each record provides information of the above four fields, as shown in FIG. 4. In this way, information of the routing table and the neighbor table in the prior art is in the same data structure. An IP can be used as a key for a hash query. When a packet passes through the three-layer protocol stack, IP information (namely, the destination host Internet Protocol address) is directly used to acquire a corresponding physical address and corresponding route information. In the table in FIG. 4, the field "IP" indicates the Internet Protocol address of the destination host; the field "MAC" indicates the physical address of the destination host; the field "Route" indicates the route information of the destination host; the field "Type" indicates the route type of the destination host.

The physical address is a media access control address, is also referred to as an Ethernet ID or an Ethernet physical address, and is an address used to determine the position of a network device. The physical address is used to uniquely identify a network adapter in a network. If a device has one or a plurality of network adapters, then each network adapter needs and has a unique physical address.

The route information records the Internet Protocol address of the next hop route, and the information is generally used in cross-domain transmission. When transmission is performed within the same local area network, this parameter is "0." Other types of characters can also be specified to indicate different route information.

The route type refers to a network distance between the destination host and a sender. In this embodiment, route types are respectively indicated by different values such as three numbers "0," "1," and "2." The number "0" indicates a router itself, the number "1" indicates a local area network in which the router is located, and the number "2" indicates a wide area network. Other types of characters can also be specified to indicate different route types.

The router itself refers to a router device itself, and in this embodiment, this option is provided only for hierarchical completeness and a progressive relationship.

The local area network refers to the local area network in which the router is located; that is, a receiver (destination host) and the sender are in the same local area network, and no cross-domain transmission is needed in this case.

The wide area network refers to that the receiver (destination host) and the sender are not in the same local area network, and cross-domain transmission is needed.

When the packet passes through the three-layer protocol stack, the route type is read first. If a parameter of the route type is 0, then it is indicated that the destination host is located in the local area network. In this case, no route information needs to be read; the physical address is directly read, and the packet is sent to the read physical address (namely, the physical address of the destination host). If the parameter of the route type is 1, then it is indicated that the destination host is located in the wide area network. In this case, the route information and the physical address need to be read, and the packet is sent to the read physical address (namely, the physical address of the next hop route).

For example, if the physical address corresponding to the destination host Internet Protocol address 192.168.0.3 is aa:bb:cc:dd:ee:ff, the route information is 0, and the route type is 1, then it is indicated that the destination host is located in the local area network, and the physical address is aa:bb:cc:dd:ee:ff. If the physical address corresponding to the destination host Internet Protocol address 192.168.24.3 is aa:cc:ee:dd:bb:fa, the route information is 192.168.1.0, and the route type is 2, then the following are indicated: the destination host is located in the wide area network; cross-domain transmission is needed; the Internet Protocol address of the next hop route is 192.168.1.0; the physical address of the next hop route is aa:cc:ee:dd:bb:fa.

The data structure of the route-neighbor table provided above is merely one possible data structure for implementing this step. When a route-neighbor table is designed, other types of characters can be used to indicate different route information or route types. Furthermore, route-neighbor table information can be increased or reduced according to requirements. For example, a policy route can be added as a field, or one or a plurality of unnecessary fields can be deleted. Another possible implementation scheme is provided below.

The Internet Protocol address, the physical address, and the route information can be used as fields, and the route type field is deleted. When the packet passes through the three-layer protocol stack, the route information and MAC information are directly read, and the packet is sent to a read physical address.

In addition to fields can be adjusted and designed according to requirements, the data structure of the route-neighbor table can be implemented not only as a hash table but also as other tree-based data structures.

If records of the local area network are within a certain range, i.e., the total number of devices in the local area network is limited, then route-neighbor table information of all of devices in the local area network can be recorded in a routing device.

In step S303, the packet is sent according to the physical address and the route type.

The physical address in this step refers to the physical address of a network adapter of the destination host or the next hop route.

Figure 5:
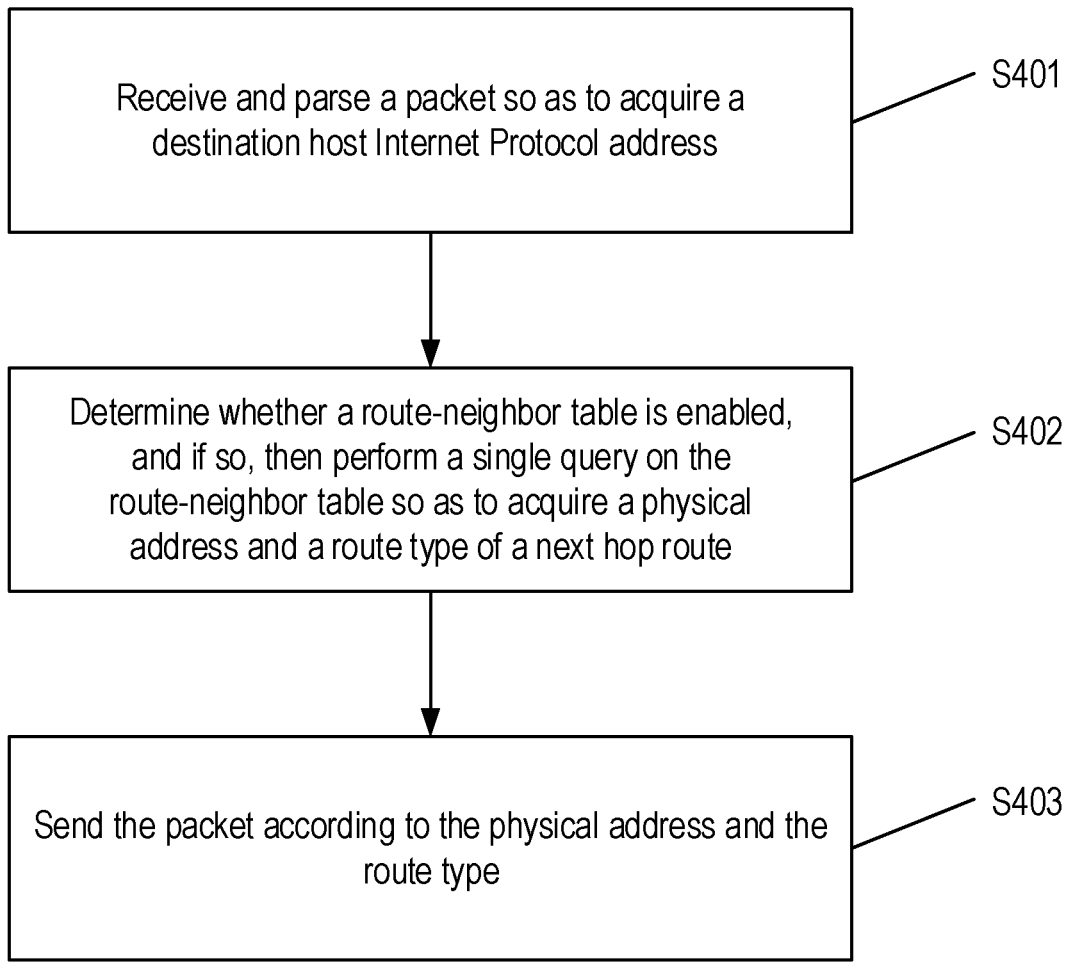
FIG. 5 is a flowchart of a network communication method provided by the second embodiment of the present application.

A second embodiment of the present application provides another network transmission method for three-layer data packet encapsulation. FIG. 5 shows a flowchart of the network transmission method for three-layer data packet encapsulation provided by the second embodiment of the present application. Detailed description is given below with reference to FIG. 5.

In step S401, a packet is received and parsed so as to acquire a destination host Internet Protocol address.

This step is a starting step of this embodiment; that is, a three-layer protocol stack receives and parses a packet so as to acquire a destination host Internet Protocol address, so that an entire process of this method is started.

The packet (message) is a data unit exchanged and transmitted in a network, namely, a data block to be sent by a site at one time. The packet contains complete data information to be sent. The lengths of packets are not the same, are not limited, and are variable.

The Internet Protocol address is a numerical label assigned to a device using an Internet Protocol (IP) in the network.

In step S402, it is determined whether a route-neighbor table is enabled, and if so, then a single query is performed on the route-neighbor table so as to acquire a physical address and a route type of a next hop route.

The most important function of three-layer data packet encapsulation is to acquire a physical address (physical address) of a destination host or a next hop route according to a destination host Internet Protocol address in an upper-layer packet. Because the destination host and a sending host may not be in the same local area network, in the prior art, a routing table needs to be used to determine, by means of an Internet Protocol address of the destination host, whether the destination host and the sending host are in the same local area network. If the destination host and the sending host are in the same local area network, then the Internet Protocol address of the destination host is acquired. If the destination host and the sending host are not in the same local area network, then an appropriate transmission path by means of which a packet can be transmitted to the destination host is selected, and an Internet Protocol address of a next hop route through which the transmission path needs to pass is acquired. After the Internet Protocol address is acquired, the routing table is used to acquire, by means of the Internet Protocol address, a physical address corresponding to the Internet Protocol address. The physical address is embedded in a packet header and is transmitted to a physical medium layer responsible for transmitting the packet.

In the present application, a routing table and a neighbor table in the above step are combined into one table, and information in the routing table and the neighbor table is stored in one data structure, so as to achieve the same function as the prior art.

The route-neighbor table is a data structure including information such as an Internet Protocol address, a physical address, route information, and a route type, and records the above information of each device.

The data structure is a way of storing and organizing data in a computer. The data structure indicates an interface or encapsulation: one data structure can be considered as an interface between two functions, or is encapsulation of a method for accessing stored content formed by a data type union.

Specifically, the route-neighbor table can be organized in the form of a hash table; the Internet Protocol address, the physical address, the route information, and the route type are used as fields, and each record provides information of the above four fields, as shown in FIG. 4. In this way, information of the routing table and the neighbor table in the prior art is in the same data structure. An IP can be used as a key for a hash query. When a packet passes through the three-layer protocol stack, IP information (namely, the destination host Internet Protocol address) is directly used to acquire a corresponding physical address and corresponding route information. In the table in FIG. 4, the field "IP" indicates the Internet Protocol address of the destination host; the field "MAC" indicates the physical address of the destination host; the field "Route" indicates the route information of the destination host; the field "Type" indicates the route type of the destination host.

The physical address is a media access control address and is also referred to as an Ethernet ID or an Ethernet physical address, and is an address used to determine the position of a network device. The physical address is used to uniquely identify a network adapter in a network. If a device has one or a plurality of network adapters, then each network adapter needs and has a unique physical address.

The route information records the Internet Protocol address of the next hop route, and the information is generally used in cross-domain transmission. When transmission is performed within the same local area network, this parameter is "0." Other types of characters can also be specified to indicate different route information.

The route type refers to a network distance between the destination host and a sender. In this embodiment, route types are respectively indicated by three numbers "0," "1," and "2." The number "0" indicates a router itself, the number "1" indicates a local area network in which the router is located, and the number "2" indicates a wide area network. Other types of characters can also be specified to indicate different route types.

The router itself refers to a router device itself, and in this embodiment, this option is provided only for hierarchical completeness and a progressive relationship.

The local area network refers to the local area network in which the router is located; that is, a receiver (destination host) and the sender are in the same local area network, and no cross-domain transmission is needed in this case.

The wide area network refers to that the receiver (destination host) and the sender are not in the same local area network, and cross-domain transmission is needed.

When the packet passes through the three-layer protocol stack, the route type is read first. If a parameter of the route type is 0, then it is indicated that the destination host is located in the local area network. In this case, no route information needs to be read; the physical address is directly read, and the packet is sent to the read physical address (namely, the physical address of the destination host). If the parameter of the route type is 1, then it is indicated that the destination host is located in the wide area network. In this case, the route information and the physical address need to be read, and the packet is sent to the read physical address (namely, the physical address of the next hop route).

For example, if the physical address corresponding to the destination host Internet Protocol address 192.168.0.3 is aa:bb:cc:dd:ee:ff, the route information is 0, and the route type is 1, then it is indicated that the destination host is located in the local area network, and the physical address is aa:bb:cc:dd:ee:ff. If the physical address corresponding to the destination host Internet Protocol address 192.168.24.3 is aa:cc:ee:dd:bb:fa, the route information is 192.168.1.0, and the route type is 2, then the following are indicated: the destination host is located in the wide area network; cross-domain transmission is needed; the Internet Protocol address of the next hop route is 192.168.1.0; the physical address of the next hop route is aa:cc:ee:dd:bb:fa.

The data structure of the route-neighbor table provided above is merely one possible data structure for implementing this step. When a route-neighbor table is designed, other types of characters can be used to indicate different route information or route types. Furthermore, route-neighbor table information can be increased or reduced according to requirements. For example, a policy route can be added as a field, or one or a plurality of unnecessary fields can be deleted. Another possible implementation scheme is provided below.

The Internet Protocol address, the physical address, and the route information can be used as fields, and the route type field is deleted. When the packet passes through the three-layer protocol stack, the route information and MAC information are directly read, and the packet is sent to a read physical address.

In addition fields can be adjusted and designed according to requirements, the data structure of the route-neighbor table can be implemented not only as a hash table but also as other tree-based data structures.

If records of the local area network are within a certain range, i.e., the total number of devices in the local area network is limited, then route-neighbor table information of all of devices in the local area network can be recorded in a routing device.

In step S403, the packet is sent according to the physical address and the route type.

The physical address in this step refers to the physical address of a network adapter of the destination host or the next hop route.

Figure 6:
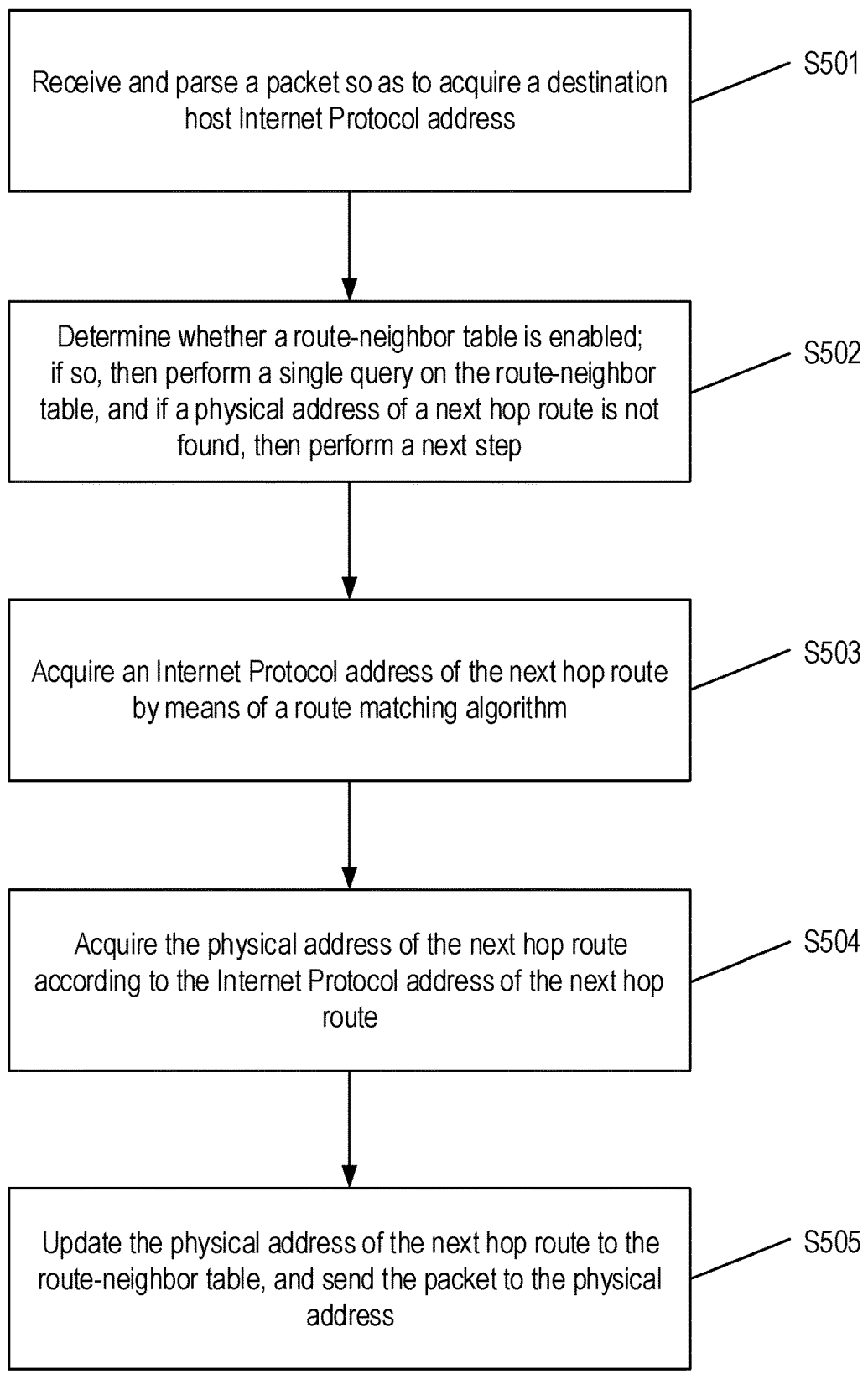
FIG. 6 is a flowchart of a network communication transmission method provided by a third embodiment of the present application.

A third embodiment of the present application provides another network communication method. FIG. 6 shows a flowchart of the network communication method provided by the third embodiment of the present application. Detailed description is given below with reference to FIG. 6.

In step S501, a packet is received and parsed so as to acquire a destination host Internet Protocol address.

This step is a starting step of this embodiment; that is, a three-layer protocol stack receives and parses a packet so as to acquire a destination host Internet Protocol address, so that an entire process of this method is started.

The packet (message) is a data unit exchanged and transmitted in a network, namely, a data block to be sent by a site at one time. The packet contains complete data information to be sent. The lengths of packets are not the same, are not limited, and are variable.

The Internet Protocol address is a numerical label assigned to a device using an Internet Protocol (IP) in the network.

In step S502, it is determined whether a route-neighbor table is enabled; if so, then a single query is performed on the route-neighbor table, and if a physical address of a next hop route or a destination host is not found, then a next step is performed.

That a physical address of a next hop route or a destination host is not found refers to that no record of the destination host exists in the route-neighbor table.

In step S503, an Internet Protocol address of the next hop route or the destination host is acquired by means of a route matching algorithm.

This step can be implemented by means of an existing technique, and the Internet Protocol address of the next hop route or the destination host is acquired by means of an existing mechanism of a routing table.

In step S504, the physical address of the next hop route or the destination host is acquired according to the Internet Protocol address of the next hop route or the destination host.

This step can be implemented by means of an existing technique, and the physical address of the next hop route or the destination host is acquired by means of an existing mechanism of a neighbor table.

In step S505, the physical address of the next hop route or the destination host is updated to the route-neighbor table, and the packet is sent to the physical address.

In this step, the Internet Protocol address of the next hop route or the destination host acquired in step S503 and the physical address of the next hop route or the destination host acquired in step S504 are stored in the route-neighbor table.

The physical address in this step refers to the physical address of a network adapter of the destination host or the next hop route.

Because changes may occur in the Internet Protocol address and a network topology, original caches may result in an incorrect query result due to these changes. Therefore, if a certain row in the table is not used within a period of time, then the row will be deleted, so as to prevent the case in which wrong information remains due to a change in the Internet Protocol address or the network topology.

Figure 7:
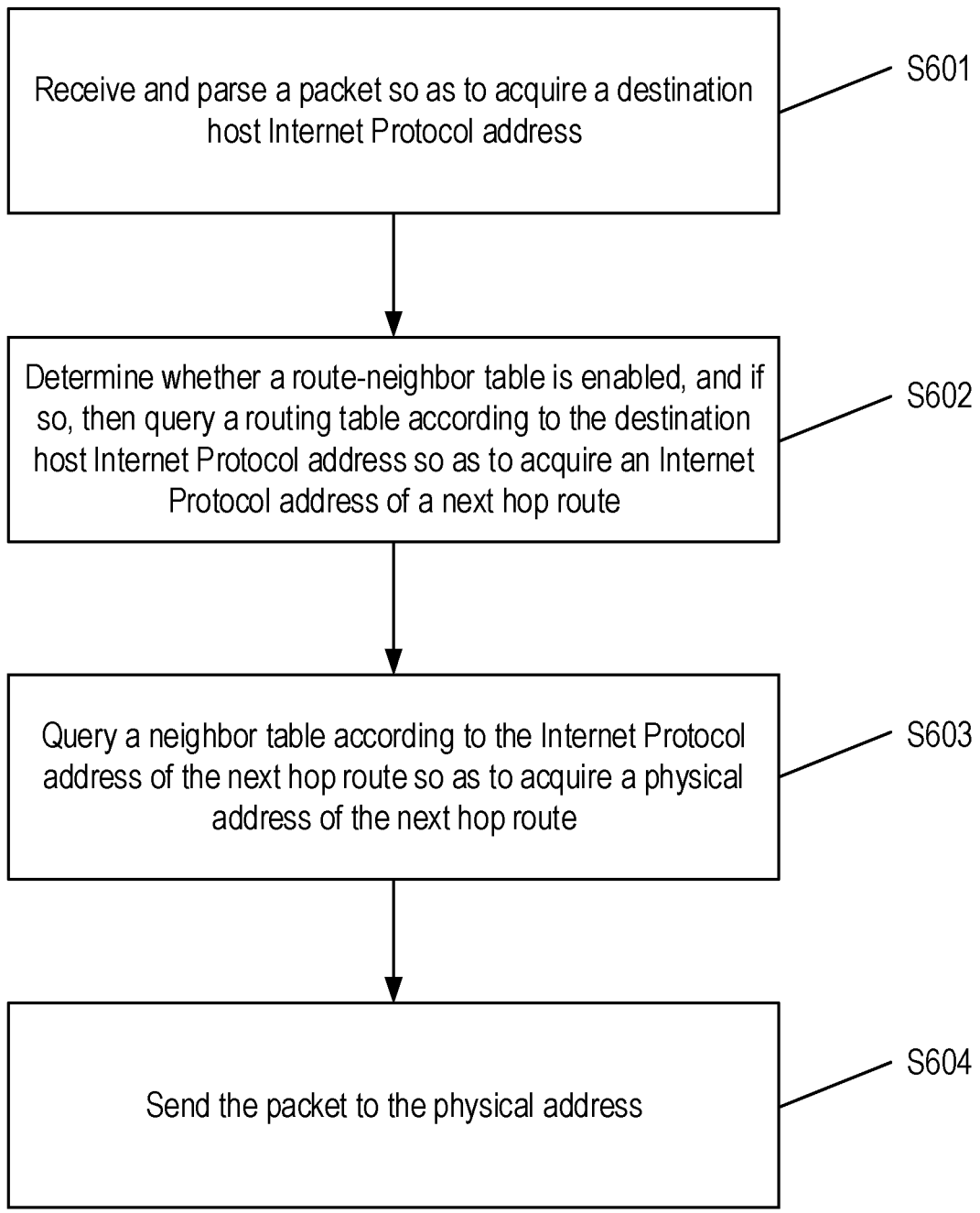
FIG. 7 is a flowchart of a network communication method provided by a fourth embodiment of the present application.

A fourth embodiment of the present application provides another network communication method. FIG. 7 shows a flowchart of the network communication method provided by the fourth embodiment of the present application. Detailed description is given below with reference to FIG. 7.

In step S601, a packet is received and parsed so as to acquire a destination host Internet Protocol address.

This step is a starting step of this embodiment; that is, a three-layer protocol stack receives and parses a packet so as to acquire a destination host Internet Protocol address, so that an entire process of this method is started.

The packet (message) is a data unit exchanged and transmitted in a network, namely, a data block to be sent by a site at one time. The packet contains complete data information to be sent. The lengths of packets are not the same, are not limited, and are variable.

The Internet Protocol address is a numerical label assigned to a device using an Internet Protocol (IP) in the network.

In step S602, it is determined whether a route-neighbor table is enabled, and if not, then a routing table is queried according to the destination host Internet Protocol address so as to acquire an Internet Protocol address of a next hop route or a destination host.

When the route-neighbor table is not enabled, an existing technique is adopted to acquire the Internet Protocol address of the next hop route or the destination host by means of an existing mechanism of the routing table.

In step S603, a neighbor table is queried according to the Internet Protocol address of the next hop route or the destination host so as to acquire a physical address of the next hop route.

This step is implemented by means of an existing technique, and the physical address of the next hop route or the destination host is acquired by means of an existing mechanism of the neighbor table.

In step S604, the packet is sent to the physical address.

The physical address in this step refers to the physical address of a network adapter of the destination host or the next hop route.

Figure 8:
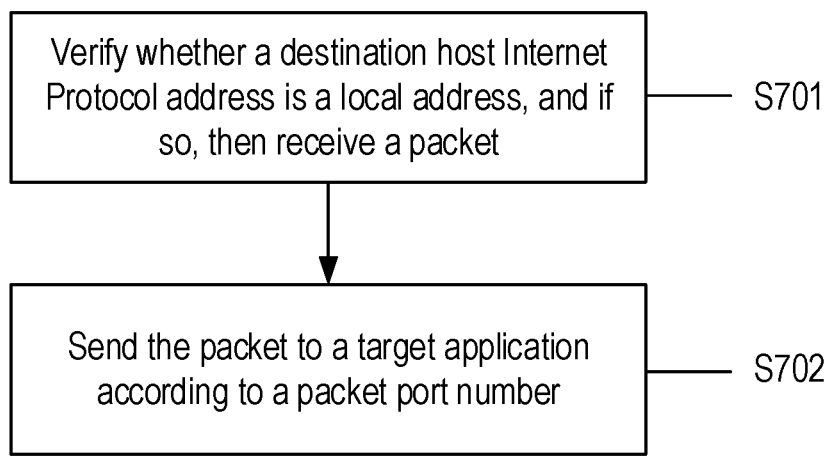
FIG. 8 is a flowchart of a network communication method provided by a fifth embodiment of the present application.

A fifth embodiment of the present application provides another network communication method. FIG. 8 shows a flowchart of the network communication method provided by the fifth embodiment of the present application. Detailed description is given below with reference to FIG. 8.

In step S701, whether a destination host Internet Protocol address is a local address is verified, and if so, then a packet is received.

In this step, a receiver verifies whether a local host is a destination host of a sender, and determines whether transmission is correct. Specifically, maximum prefix matching is performed according to a destination host Internet Protocol address of a packet so as to determine whether the packet is sent to the local host or a non-local host. If the packet is sent to the local host, then the packet is received, and an application is notified to receive the packet.

In step S702, the packet is sent to a target application according to a packet port number.

In a server, it is possible for a plurality of user processes to simultaneously use a TCP. In order to identify data associated with each process, a port number is used. Each process occupies one port number. In this step, the packet is sent to an application having the same port number as the packet.

If the packet is sent to a non-local host, then when a forwarding function is enabled, a single query is performed on a route-neighbor table so as to acquire a router physical address, replace a physical of the received packet with the router physical address, and forward the received packet to the router physical address.

In addition, corresponding to the above method embodiments, the present application further provides a network communication apparatus. Apparatus embodiments are described below. The apparatus embodiments are similar to the method embodiments, and the description is relatively brief. Please refer to the method embodiments for details.

The present application provides a network communication apparatus, including:
 a parsing unit, used to receive and parse a packet so as to acquire a destination host Internet Protocol address;
 a query unit, used to perform a single query on a route-neighbor table according to the destination host Internet Protocol address so as to acquire a physical address and a route type of a next hop route; and
 a packet sending unit, used to send the packet according to the physical address and the route type.

In addition, the present application further provides another network communication apparatus, and the network communication apparatus includes:
 a parsing unit, used to receive and parse a packet so as to acquire a destination host Internet Protocol address;
 a determination unit, used to determine whether a route-neighbor table is enabled;
 a query unit, used to, when the route-neighbor table is enabled, perform a single query on the route-neighbor table so as to acquire a physical address and a route type of a next hop route; and
 a packet sending unit, used to send the packet according to the physical address and the route type.

The present application has been disclosed above through preferred embodiments, but is not intended to be limited thereto. Possible variations and modifications can be made by those skilled in the art without departing from the spirit and scope of the present application. Therefore, the protection scope of the present application shall be defined by the claims of the present application.

In a typical configuration, a computing device includes one or a plurality of processors (CPUs), input/output interfaces, network interfaces, and memories.

The memory may include a computer-readable medium in the form of a non-permanent memory, a Random Access Memory (RAM), and/or non-volatile memory or the like, such as a Read-Only Memory (ROM) or a flash memory (flash RAM). A memory is an example of a computer-readable medium.

1. The computer-readable medium includes permanent and non-permanent, movable and non-movable media that can achieve information storage by means of any methods or techniques. The information may be computer-readable instructions, data structures, modules of programs or other data. Examples of a storage medium of a computer include, but are not limited to, a phase change memory (PRAM), a Static Random Access Memory (SRAM), a Dynamic Random Access Memory (DRAM), other types of Random Access Memories (RAMs), a Read-Only Memory (ROM), an Electrically Erasable Programmable Read-Only Memory (EEPROM), a flash memory or other memory technologies, a Compact Disk Read-Only Memory (CD-ROM), a Digital Versatile Disc (DVD) or other optical storages, a cassette tape, a magnetic tape/magnetic disk storage or other magnetic storage devices, or any other non-transmission medium, and can be used to store information accessible by a computing device. According to the definitions herein, the computer-readable medium does not include non-transitory computer-readable media (transitory media), such as a modulated data signal and a carrier wave.

2. Those skilled in the art should understand that embodiments of the present application may be provided as a method, a system, or a computer program product. Therefore, the present application may use the form of a full hardware embodiment, a full software embodiment, or an embodiment combining software and hardware. Moreover, the present application may use the form of a computer program product implemented on one or a plurality of computer-usable storage media (including, but not limited to, a magnetic disk memory, a CD-ROM, an optical memory, and so on) containing computer-usable program code therein.

What is claimed:
1. A network communication method, comprising:
 receiving and parsing a packet so as to acquire a destination host Internet Protocol address;
 performing a single query on a route-neighbor table according to the destination host Internet Protocol address so as to acquire a physical address and a route type of a next hop route, wherein the route type comprises a local area network, wherein if a number of hosts in the local area network is countable, then the route-neighbor table stores Internet Protocol addresses, physical addresses, route information, and route types, wherein the route-neighbor table is a data structure that combines a routing table and a neighbor table into one table, and wherein information of the routing table and the neighbor table is stored in one data structure; and
 sending the packet according to the physical address and the route type.
2. The network communication method according to claim 1, wherein the route-neighbor table is a hash data table; correspondingly, the performing the single query on the route-neighbor table is specifically performing a single hash query on the route-neighbor table.

3. The network communication method according to claim 1, wherein before the packet is sent, the physical address is encapsulated into an Ethernet packet header of the packet.

4. The network communication method according to claim 1, wherein the route-neighbor table is a hash data table comprising fields of an Internet Protocol address, a physical address, route information, and a route type of a network device.

5. The network communication method according to claim 1, wherein the route types comprise a route, the local area network, and a wide area network.

6. The network communication method according to claim 5, wherein the route types are indicated by different values.

7. The network communication method according to claim 1, wherein all of the route types are the local area network.

8. The network communication method according to claim 1, wherein the route-neighbor table is a hash data table comprising fields of an Internet Protocol address, a physical address, and route information of a network device.

9. The network communication method according to claim 1, wherein the route-neighbor table is a hash data table comprising fields of an Internet Protocol address and a physical address of a network device.

10. A network communication method, comprising:
receiving and parsing a packet so as to acquire a destination host Internet Protocol address;
determining whether a route-neighbor table is enabled, and if so, then performing a single query on the route-neighbor table so as to acquire a physical address and a route type of a next hop route, wherein the route type comprises a local area network, wherein if a number of hosts in the local area network is countable, then the route-neighbor table stores Internet Protocol addresses, physical addresses, route information, and route types, wherein the route-neighbor table is a data structure that combines a routing table and a neighbor table into one table, and wherein information of the routing table and the neighbor table is stored in one data structure; and
sending the packet according to the physical address and the route type.

11. The network communication method according to claim 10, wherein the route-neighbor table is a hash data table; correspondingly, the performing the single query on the route-neighbor table is specifically performing a single hash query on the route-neighbor table.

12. The network communication method according to claim 10, wherein before the packet is sent to the physical address, the physical address is encapsulated into an Ethernet packet header of the packet.

13. The network communication method according to claim 10, wherein the route-neighbor table is a hash data table comprising fields of an Internet Protocol address, a physical address, route information, and a route type of a network device.

14. The network communication method according to claim 10, wherein the route types comprise a route, the local area network, and a wide area network.

15. The network communication method according to claim 10, wherein all of the route types are the local area network.

16. The network communication method according to claim 10, wherein the route-neighbor table is a hash data table comprising fields of an Internet Protocol address, a physical address, and route information of a network device.

17. The network communication method according to claim 10, wherein the route-neighbor table is a data table comprising fields of an Internet Protocol address and a physical address, and is used to record information of a network device.

18. A network communication method, comprising:
receiving and parsing a packet so as to acquire a destination host Internet Protocol address;
determining whether a route-neighbor table is enabled; if so, then performing a single query on the route-neighbor table, and if a physical address of a next hop route is not found, then performing a next step, wherein the route-neighbor table comprises a route type, wherein the route type comprises a local area network, wherein if a number of hosts in the local area network is countable, then the route-neighbor table stores Internet Protocol addresses, physical addresses, route information, and route types, wherein the route-neighbor table is a data structure that combines a routing table and a neighbor table into one table, and wherein information of the routing table and the neighbor table is stored in one data structure;
acquiring an Internet Protocol address of the next hop route by means of a route matching algorithm;
acquiring the physical address of the next hop route according to the Internet Protocol address of the next hop route; and
updating the physical address of the next hop route to the route-neighbor table, and sending the packet to the physical address.

19. The network communication method according to claim 18, wherein before the sending the packet to the physical address, the physical address is encapsulated into an Ethernet packet header of the packet.

20. The network communication method according to claim 18, wherein the route-neighbor table is a hash data table further comprising fields of an Internet Protocol address, a physical address, and route information of a network device.

21. The network communication method according to claim 18, wherein the route types comprise a route, the local area network, and a wide area network.

22. The network communication method according to claim 18, wherein all of the route types are the local area network.

23. The network communication method according to claim 18, wherein the route-neighbor table is a data table comprising fields of an Internet Protocol address, a physical address, and route information of a network device.

24. The network communication method according to claim 18, wherein the route-neighbor table is a hash data table comprising fields of an Internet Protocol address and a physical address of a network device.

25. A network communication method, comprising:
receiving and parsing a packet so as to acquire a destination host Internet Protocol address;
determining whether a route-neighbor table is enabled, and if not, then querying a routing table according to the destination host Internet Protocol address so as to acquire an Internet Protocol address of a next hop route, wherein the route-neighbor table comprises a route type, wherein the route type comprises a local area network, wherein if a number of hosts in the local area network is countable, then the route-neighbor table stores Internet Protocol addresses, physical addresses, route information, and route types, wherein the route-neighbor table is a data structure that combines a routing table and a neighbor table into one table, and wherein information of the routing table and the neighbor table is stored in one data structure;

querying a neighbor table according to the Internet Protocol address of the next hop route so as to acquire a physical address of the next hop route; and sending the packet to the physical address.

26. A network communication method, comprising:

verifying whether a destination host Internet Protocol address is a local address; if so, then receiving a packet, and sending the packet to a target application according to a packet port number; and if not, then when a forwarding function is enabled, performing a single query on a route-neighbor table so as to acquire a router physical address, wherein the route-neighbor table comprises a route type, wherein the route type comprises a local area network, wherein if a number of hosts in the local area network is countable, then the route-neighbor table stores Internet Protocol addresses, physical addresses, route information, and route types, wherein the route-neighbor table is a data structure that combines a routing table and a neighbor table into one table, and wherein information of the routing table and the neighbor table is stored in one data structure, replacing a physical address of a received packet with the router physical address, and forwarding the received packet to the router physical address.

27. A network communication apparatus, comprising:

a parsing unit configured to receive and parse a packet so as to acquire a destination host Internet Protocol address;

a query unit configured to perform a single query on a route-neighbor table according to the destination host Internet Protocol address so as to acquire a physical address and a route type of a next hop route, wherein the route type comprises a local area network, wherein if a number of hosts in the local area network is countable, then the route-neighbor table stores Internet Protocol addresses, physical addresses, route information, and route types, wherein the route-neighbor table is a data structure that combines a routing table and a neighbor table into one table, and wherein information of the routing table and the neighbor table is stored in one data structure; and a packet sending unit configured to send the packet according to the physical address and the route type.

28. A network communication apparatus, comprising:

a parsing unit configured to receive and parse a packet so as to acquire a destination host Internet Protocol address;

a determination unit configured to determine whether a route-neighbor table is enabled;

a query unit configured to, when the route-neighbor table is enabled, perform a single query on the route-neighbor table so as to acquire a physical address and a route type of a next hop route, wherein the route type comprises a local area network, wherein if a number of hosts in the local area network is countable, then the route-neighbor table stores Internet Protocol addresses, physical addresses, route information, and route types, wherein the route-neighbor table is a data structure that combines a routing table and a neighbor table into one table, and wherein information of the routing table and the neighbor table is stored in one data structure; and a packet sending unit configured to send the packet according to the physical address and the route type.

* * * * *